(12) United States Patent
Euresti et al.

(10) Patent No.: US 9,104,687 B2
(45) Date of Patent: Aug. 11, 2015

(54) SYSTEM AND METHOD FOR PREVENTING DUPLICATE UPLOADS OF MODIFIED PHOTOS IN A SYNCHRONIZED CONTENT MANAGEMENT SYSTEM

(71) Applicant: Dropbox, Inc., San Francisco, CA (US)

(72) Inventors: David Euresti, San Francisco, CA (US); Brian Smith, San Francisco, CA (US); Alicia Chen, San Francisco, CA (US); Aston Motes, San Francisco, CA (US); Rian Hunter, San Francisco, CA (US); Jie Tang, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 48 days.

(21) Appl. No.: 13/723,074

(22) Filed: Dec. 20, 2012

(65) Prior Publication Data

US 2014/0181057 A1 Jun. 26, 2014

(51) Int. Cl.
*G06F 17/00* (2006.01)
*G06F 17/30* (2006.01)

(52) U.S. Cl.
CPC .................................. *G06F 17/3015* (2013.01)

(58) Field of Classification Search
None
See application file for complete search history.

(56) References Cited

U.S. PATENT DOCUMENTS

| | | |
|---|---|---|
| 6,684,212 B1 | 1/2004 | Day et al. |
| 6,687,741 B1 | 2/2004 | Ramaley et al. |
| 6,988,138 B1 | 1/2006 | Alcorn et al. |
| 7,177,426 B1 | 2/2007 | Dube |
| 7,206,806 B2 | 4/2007 | Pineau |
| 7,401,104 B2 | 7/2008 | Shah et al. |
| 7,676,526 B1 | 3/2010 | Beloussov et al. |
| 7,730,113 B1 * | 6/2010 | Payette et al. ................. 707/821 |
| 7,734,690 B2 | 6/2010 | Moromisato et al. |
| 7,756,892 B2 | 7/2010 | Levy |
| 7,822,793 B2 | 10/2010 | Rawat et al. |
| 7,970,850 B1 | 6/2011 | Callanan et al. |
| 8,065,424 B2 | 11/2011 | Foresti et al. |
| 8,140,506 B2 | 3/2012 | Pennington |
| 8,194,940 B1 | 6/2012 | Kiyohara |
| 2002/0073443 A1 | 6/2002 | Heifetz et al. |
| 2002/0133515 A1* | 9/2002 | Kagle et al. ................... 707/511 |
| 2003/0014477 A1 | 1/2003 | Oppenheimer et al. |
| 2003/0097410 A1 | 5/2003 | Atkins et al. |
| 2003/0120729 A1 | 6/2003 | Kim et al. |

(Continued)

OTHER PUBLICATIONS

GIMP Quickies, http://www.gimp.org/tutorials/GIMP_Quickies/.*

(Continued)

*Primary Examiner* — Robert Beausoliel, Jr.
*Assistant Examiner* — Hau H Hoang
(74) *Attorney, Agent, or Firm* — Novak Druce Connolly Bove + Quigg LLP

(57) ABSTRACT

A method and system for automatically rotating image files and preventing duplicate uploads in a remote file storage system is described. The system receives an image file. The system calculates a hash value associated with newly uploaded files. The system then automatically rotates the images based on orientation data associated with the files (if included). The system then compares the hash value(s) associated with the new file(s) with the hash values from the existing files stored on the remote file storage system. If the hash values of any of the new files to be uploaded match a hash value on the hash value list, then the system prevents the new files from being uploaded to the remote file storage system.

22 Claims, 4 Drawing Sheets

(56) References Cited

U.S. PATENT DOCUMENTS

| | | | |
|---|---|---|---|
| 2003/0152904 A1 | 8/2003 | Doty, Jr. | |
| 2003/0227487 A1 | 12/2003 | Hugh | |
| 2004/0025025 A1* | 2/2004 | Venkatesan et al. | 713/176 |
| 2004/0044746 A1 | 3/2004 | Matsusaka | |
| 2005/0076030 A1 | 4/2005 | Hada et al. | |
| 2005/0091289 A1 | 4/2005 | Shappell et al. | |
| 2005/0240428 A1 | 10/2005 | Gabrick et al. | |
| 2006/0031489 A1 | 2/2006 | Marcjan | |
| 2006/0061599 A1* | 3/2006 | Yu et al. | 345/649 |
| 2006/0095514 A1 | 5/2006 | Wang et al. | |
| 2006/0133407 A1 | 6/2006 | Kuisma | |
| 2006/0230030 A1 | 10/2006 | Volpa et al. | |
| 2007/0156434 A1 | 7/2007 | Martin et al. | |
| 2007/0174341 A1 | 7/2007 | Saripalli et al. | |
| 2007/0203917 A1 | 8/2007 | Du et al. | |
| 2007/0214169 A1 | 9/2007 | Audet et al. | |
| 2007/0239760 A1 | 10/2007 | Simon | |
| 2007/0260747 A1 | 11/2007 | Samzelius et al. | |
| 2008/0091725 A1* | 4/2008 | Hwang et al. | 707/104.1 |
| 2008/0109910 A1 | 5/2008 | Day et al. | |
| 2008/0216139 A1 | 9/2008 | Liwerant et al. | |
| 2009/0216569 A1 | 8/2009 | Bonev et al. | |
| 2009/0287715 A1 | 11/2009 | Chi et al. | |
| 2010/0063961 A1 | 3/2010 | Guiheneuf et al. | |
| 2010/0185698 A1 | 7/2010 | Lee et al. | |
| 2010/0211998 A1 | 8/2010 | Soelberg et al. | |
| 2010/0274864 A1 | 10/2010 | Jalili | |
| 2011/0137986 A1 | 6/2011 | Wolf | |
| 2011/0154456 A1 | 6/2011 | Machani | |
| 2011/0167159 A1 | 7/2011 | Bethlehem et al. | |
| 2011/0264532 A1 | 10/2011 | Chan et al. | |
| 2011/0264768 A1 | 10/2011 | Walker et al. | |
| 2011/0276638 A1 | 11/2011 | Errico et al. | |
| 2011/0287748 A1 | 11/2011 | Angel et al. | |
| 2012/0127328 A1* | 5/2012 | Winbush, III | 348/207.1 |
| 2012/0131005 A1* | 5/2012 | Shen et al. | 707/737 |
| 2012/0151002 A1 | 6/2012 | Lin et al. | |
| 2012/0197980 A1 | 8/2012 | Terleski et al. | |
| 2012/0209892 A1 | 8/2012 | MacAskill et al. | |
| 2012/0278404 A1 | 11/2012 | Meisels et al. | |
| 2012/0290686 A1 | 11/2012 | Anchan et al. | |
| 2012/0324121 A1 | 12/2012 | Carr et al. | |
| 2013/0013561 A1 | 1/2013 | Chan et al. | |
| 2013/0091026 A1 | 4/2013 | Deng et al. | |
| 2013/0174272 A1 | 7/2013 | Chevalier et al. | |
| 2013/0332854 A1 | 12/2013 | Roman et al. | |
| 2013/0332856 A1 | 12/2013 | Sanders et al. | |

OTHER PUBLICATIONS

U.S. Notice of Allowance dated Feb. 27, 2015, issued in related U.S. Appl. No. 13/597,301.

Popitsch, Nick et al., "Ad-hoc File Sharing Using Linked DataTechnologies", University of Vienna, Department of Distributed and Multimedia Systems, pp. 1-12.

U.S. Office Action dated Dec. 4, 2014, issued in related U.S. Appl. No. 13/723,396.

U.S. Office Action dated Jun. 5, 2014, issued in related U.S. Appl. No. 13/723,396.

U.S. Office Action dated Oct. 29, 2014, issued in related U.S. Appl. No. 13/596,735.

U.S. Office Action dated Oct. 23, 2014, issued in related U.S. Appl. No. 13/597,301.

U.S. Office Action dated May 23, 2014, issued in related U.S. Appl. No. 13/597,301.

U.S. Office Action dated Apr. 17, 2013, issued in related U.S. Appl. No. 13/597,301.

U.S. Office Action dated Jul. 14, 2014, issued in related U.S. Appl. No. 13/217,944.

U.S. Office Action dated Jul. 12, 2013, issued in related U.S. Appl. No. 13/217,944.

U.S. Office Action dated Dec. 7, 2012, issued in related U.S. Appl. No. 13/217,944.

U.S. Office Action dated Mar. 13, 2013, issued in related U.S. Appl. No. 13/596,735.

U.S. Office Action dated Nov. 13, 2012, issued in related U.S. Appl. No. 13/596,735.

* cited by examiner

SYSTEM AND METHOD FOR PREVENTING DUPLICATE UPLOADS OF MODIFIED PHOTOS IN A SYNCHRONIZED CONTENT MANAGEMENT SYSTEM

BACKGROUND

Today, a large percentage of electronic content management, storage, and related services are remote, or "cloud" based. That is, many services allow a user to upload, store, and share content through remote servers. The trend is to centralize files (e.g., photos) and allow a user to access these centrally stored files through multiple devices and/or locations, utilizing a single account. This is especially useful for two reasons. First, mobile devices, such as smart phones, tablets, laptops and cameras, have limited storage space. Second, users may desire to access all of their files from any device they own. However, because it is impractical to store copies of every file on each device, central storage systems help to minimize problems associated with limited storage space and device agnostic access to files. Moreover, in order to make centralized storage more efficient for the user, some services may include cross-platform synchronization and/or sharing functionality. These services allow a user to setup their device to allow for the automatic upload of digital content to the central storage system. However, when the user has multiple devices that are configured to allow for automatic upload of content, the system runs the risk of uploading the same file twice, which may result in a misallocation of storage space and cause unnecessary clutter on the system.

Additionally, when image files are uploaded, the central storage system does not properly orient the image based on information associated with the image file. Thus, when a user views an image file in a viewing application or in an application that is configured to modify the image, the image is typically rotated to match the orientation that the capture device was in when the image was captured. Thus, it would be advantageous to automatically rotate uploaded images so they are properly displayed in various applications used to view and/or edit the image (i.e., if a photo is taken with the camera held vertically, the system may automatically rotate the image file so the image is displayed in the proper orientation).

Various embodiments of the present systems and methods recognize and address one or more the foregoing limitations of prior art systems and methods.

SUMMARY

A computer-implemented method or system of modifying image files and uploading the modified image file to a content management system may include receiving a first image file, wherein the first image file contains a first image in a first orientation and orientation data for the first image. The system or method may calculate a first hash value for the first image file that corresponds to the first image when in the first orientation. The method and system may modify the first image file by rotating the first image from the first orientation to a second orientation based on the orientation data and store the modified first image file in memory. For example, the method or system may rotate the image by ninety, one-hundred and eighty, minus ninety degrees, or by any other amount of rotation to put the image in a proper orientation based on the orientation data. In another example, the method or system may flip the image across an axis, such as a horizontal, vertical, or diagonal axis. The system or method may then receive a second image file that contains a second image in a first orientation. The system and method may then calculate a second hash value for the second image file that corresponds to the second image in the first orientation. The system may then determine whether the first image file and the second image file are duplicates by comparing the first hash value to the second hash value. Finally, in response to determining that the first hash value equals the second hash value, the system or method may treat the second image file as a duplicate of the first image file.

Additionally, in various embodiments, if the second image file is found to be a duplicate of the first image file, the system may be configured to delete the first image file, store the second image file in a temporary location, prevent the second image file from being uploaded to the system or store the second image file and delete the first image file.

In various embodiments, the first image file and the second image file can be received from different client devices. Additionally, the different client devices can be configured to run different operating systems. For example, a first client device can be a desktop computer running a desktop operating system and a second client device can be a mobile device running a mobile operating system. In another example, a first and second devices can be different mobile devices or different desktop devices running different operating system. Other combinations or types of client devices are also possible.

BRIEF DESCRIPTION OF THE DRAWINGS

Various embodiments of a system for uploading, rotating, and preventing the upload of duplicate image files to a content management system are described below. In the course of this description, references will be made to the accompanying drawings, which are not necessarily drawn to scale, and wherein.

DETAILED DESCRIPTION

Figure 1:
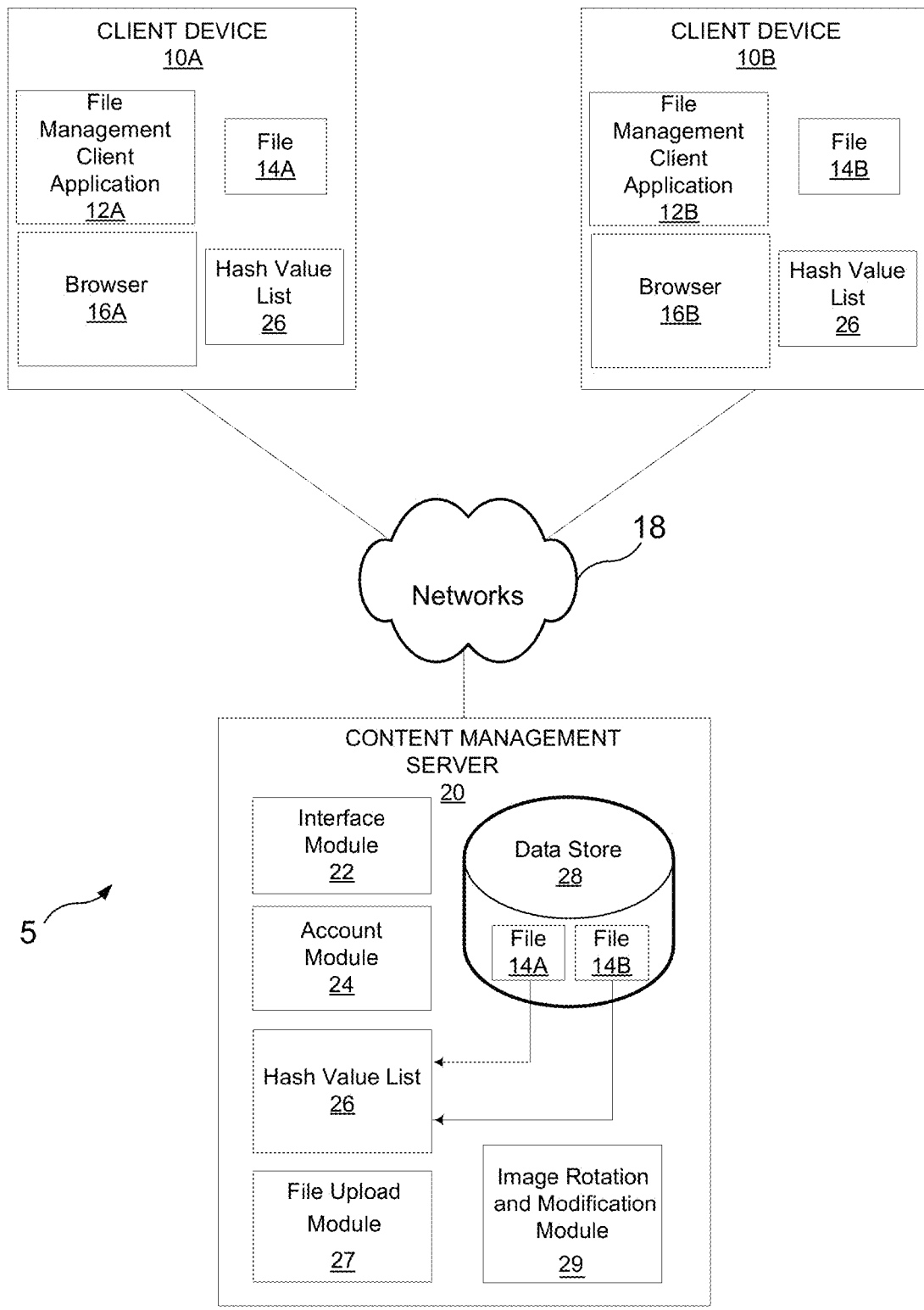
FIG. 1 shows a block diagram of a content management system in accordance with an embodiment of the present system.

Various embodiments will now be described. It should be understood that the present system and method may be embodied in many different forms and should not be construed as limited to the embodiments set forth herein. Like numbers refer to like elements throughout.

System Overview

A system, according to various embodiments, includes a synched content management system configured to automatically upload files (e.g., image files or photos) from a client device (e.g., a desktop computer, a laptop computer, a mobile device, a handheld device, or other computing device) to a remote server and storage system. To prevent the same file from being uploaded twice (and thereby creating a duplicate copy of the file on the server), the content management system uses a hash value that is calculated based on the file, and/or information associated with the file, to determine whether the file has been previously uploaded to the content management system.

In various embodiments, the hash values may be calculated for each file in a user account and stored in a hash value list. The hash values for each file may be calculated based on any information related to the file. This information may include, for example, the size of the file, the file name, the content of the file, the orientation of the image embodied by the file, and/or any other suitable information associated with the image file. Additionally, different devices may calculate hash values based on different attributes associated with the file. For example, to save space and bandwidth on a mobile device, the system may create a hash value for an image file that is based on a small amount of information associated with the file. In contrast, on a desktop computer, a hash value may be calculated based on a more complete set of information. Thus, in various embodiments, the hash value list may include one or more hash values for each file (e.g., both a hash value used by a mobile device and a hash value used by a desktop computer) to allow different client devices to share a common list of hash values.

Thus, when a new file is imported onto a client device and is readied to be uploaded, the system may be configured to calculate a hash value for the file. The system then compares the new file hash value with the stored list of hash values to determine whether the file is a duplicate of a previously uploaded file. That is, if a file's hash value matches a hash value on the hash value list, the system may consider the image file a duplicate of a previously uploaded file. In various embodiments, the system may then automatically prevent an upload of the image file to the content management server. If an image file's hash value does not match any of the values on the compiled hash value list, then the client device may upload the new file to the server. In some cases, the server may use more sophisticated hash value comparison techniques to further verify that the uploaded file is not a duplicate of another file on the system.

In various embodiments, the system may also be configured to automatically rotate an image in an image file to its correct orientation. That is, the system rotates an image based on orientation information associated with the image file (e.g., by rotating the image ninety degrees based on metadata so that the image is properly orientated when it is viewed by various applications). In these embodiments, timing of the hash value calculation may be important. For example, some image file's orientation information may change (e.g., be rewritten) after the system rotates the image. Therefore, a hash value calculated after the rotation of the image may differ from a hash value calculated based on the image's original orientation. Thus, in various embodiments, the system may be configured to calculate a hash value both prior to and after the image is rotated to allow the system to detect duplicate uploads of an unmodified or modified image file.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a mobile device, a special purpose computer, smart handheld device, or other programmable data processing apparatus to produce a machine. As such, the instructions which execute on the general purpose computer, special purpose computer, smart mobile device, smart handheld device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of content management system 5 according to a particular embodiment. Content management system 5 includes one or more client devices 10A or 10B (collectively "10"), such as a desktop computer, a mobile device (e.g., a laptop computer, a smart phone, a mobile computing device, or a handheld device) or another device capable of transferring files over network 18, that are in communication with content management server 20. Network 18, between content management server 20 and client devices 10, may be, for example, implemented via one or more wired or wireless networks such as LANs, WANs, a cellular network, a Wi-Fi network, or via the Internet. For purposes of ease of explanation and clarity, no specific cellular network is shown in FIG. 1 as a network for a mobile device. However, a cellular tower may be coupled to a cellular network provider, which may be operatively coupled to network 18.

In some embodiments, content management server 20 includes data storage 28, interface module 22, account module 24, file upload module 27, and file image rotation and modification module 29. Content management server 20 is connected to one or more client devices 10 via network 18. In various embodiments, content management server 20 may include one or more servers that are located in close physical proximity, or some servers may be locally together and others remote. In either case, all devices, wherever located, function as a system.

Interface module 22 facilitates file access and file storage between content management server 20 and client devices 10. Interface module 22 receives files from and sends files to client devices 10 consistent with the user's preferences for sharing files. Interface module 22 may act as the counterpart to a client-side file storage service client application 12A, 12B user interface that allows a user to manipulate files directly stored on content management server 20. In some embodiments, software operating on client devices 10 integrates network-stored files with the client's local file system to enable a user to manipulate network-stored files through the same user interface (UI) used to manipulate files on the local file system, e.g., via a file explorer, file finder, or browser application. As an alternative or supplement to the client-side file explorer interface, user interface module 22 may provide a web interface for client devices 10 to access (e.g. via browser 16) and allow a user to manipulate files stored on content management server 20. In this way, the user can directly manipulate files stored on content management server 20.

In various embodiments, data store 28 stores files such as those uploaded using client devices 10. It should be understood that, in various embodiments, data store 28 may include of multiple data stores—some local to, and some remote from, content management server 20. In the embodiment illustrated in FIG. 1, a first user associated with client 10A has certain files 14A associated with their account, and a second user associated with client 10B has certain files 14B associated with their account. Copies of each of these files are centrally stored in data store 28. Copies of each respective user's files may also be locally stored on multiple client devices 10 associated with the user's account. In various embodiments, each client device 10A and 10B may be used by the same user. In these embodiments, each client device 10 may have files stored on content management server 20 that are synced across the client devices. In other embodiments, the client devices may be used by different users.

Data store 28 maintains, for each user in a file journal, information identifying the user, information describing the user's file directory, etc. In some embodiments, the file journal is maintained on content management server 20. This file journal may be updated periodically using information obtained directly from content management server 20 and/or from information obtained from one or more client devices 10 linked to the user's account. In this way, the server-stored file journal (hereinafter the "server-side file journal") is updated when a file is changed either on the server or on one of the client devices associated with the user's account. When a file is changed, content management server 20 propagates the change to each client device associated with the user's account. For example, if a user makes a change to a particular file on a first client device, the change may be reflected in the server-side file journal. The system then uses the server-side file journal to propagate the change to all client devices associated with the user's account. Such techniques may be implemented, for example, within the context of a synchronized file system such as the Dropbox™ Service of Dropbox, Inc. of San Francisco, Calif.

Figure 2:
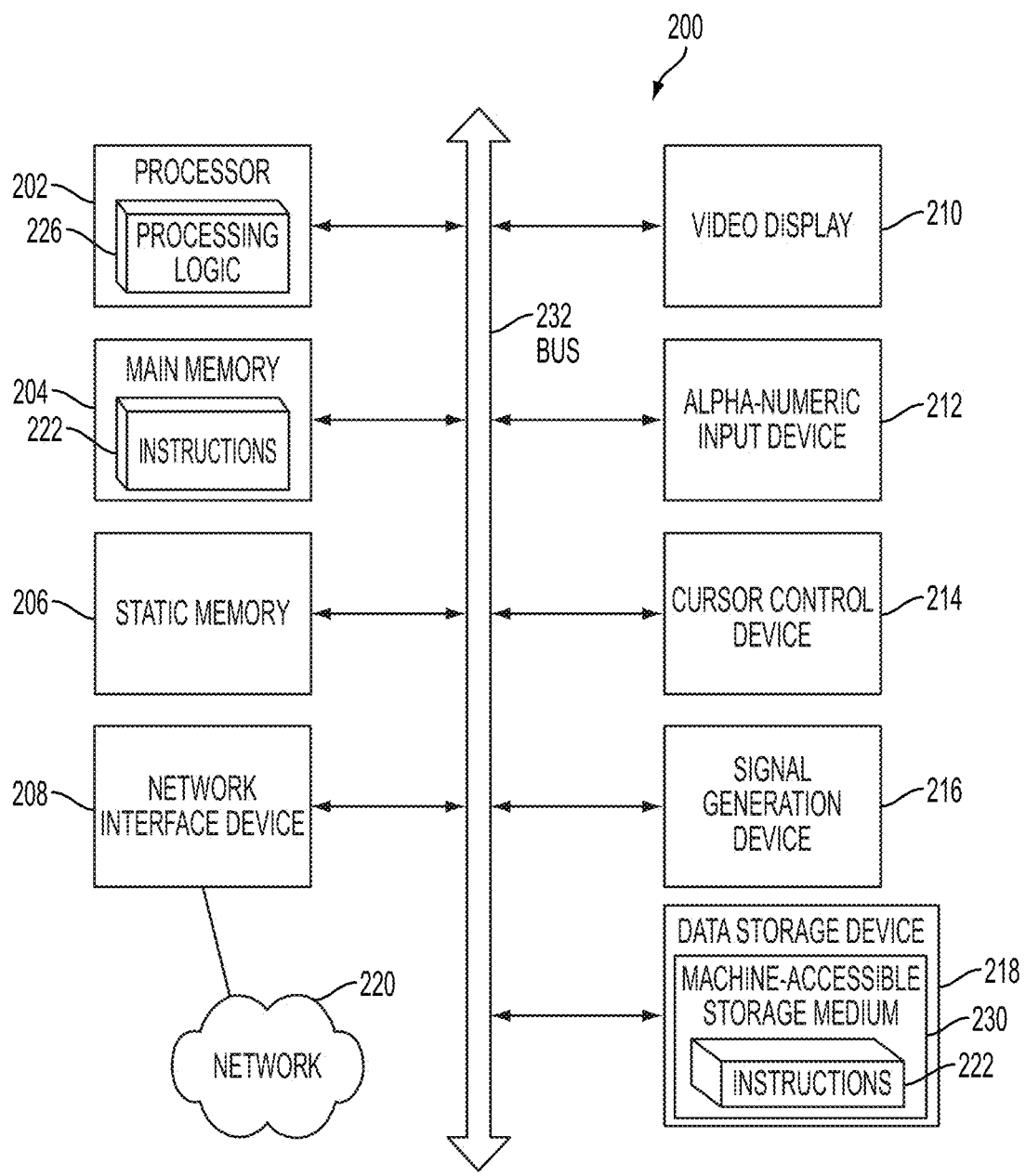
FIG. 2 shows a block diagram of a computer that may be used, for example, as a client device or server computer within the context of the content management system of FIG. 1.

FIG. 2 illustrates a diagrammatic representation of computer 200 that can be used within content management system 5, for example, as client computer, or as content management server 20 (FIG. 1). For purposes of this disclosure, reference to a server or processor, shall be interpreted to include either a single server, a single processor, or multiple servers, or multiple processors.

In particular embodiments, computer 200 may be connected (e.g., networked) to other computers by a LAN, WAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alphanumeric input device 212 (e.g., a keyboard), cursor control device 214 (e.g., a mouse), and signal generation device 216 (e.g., a speaker).

Figure 3:
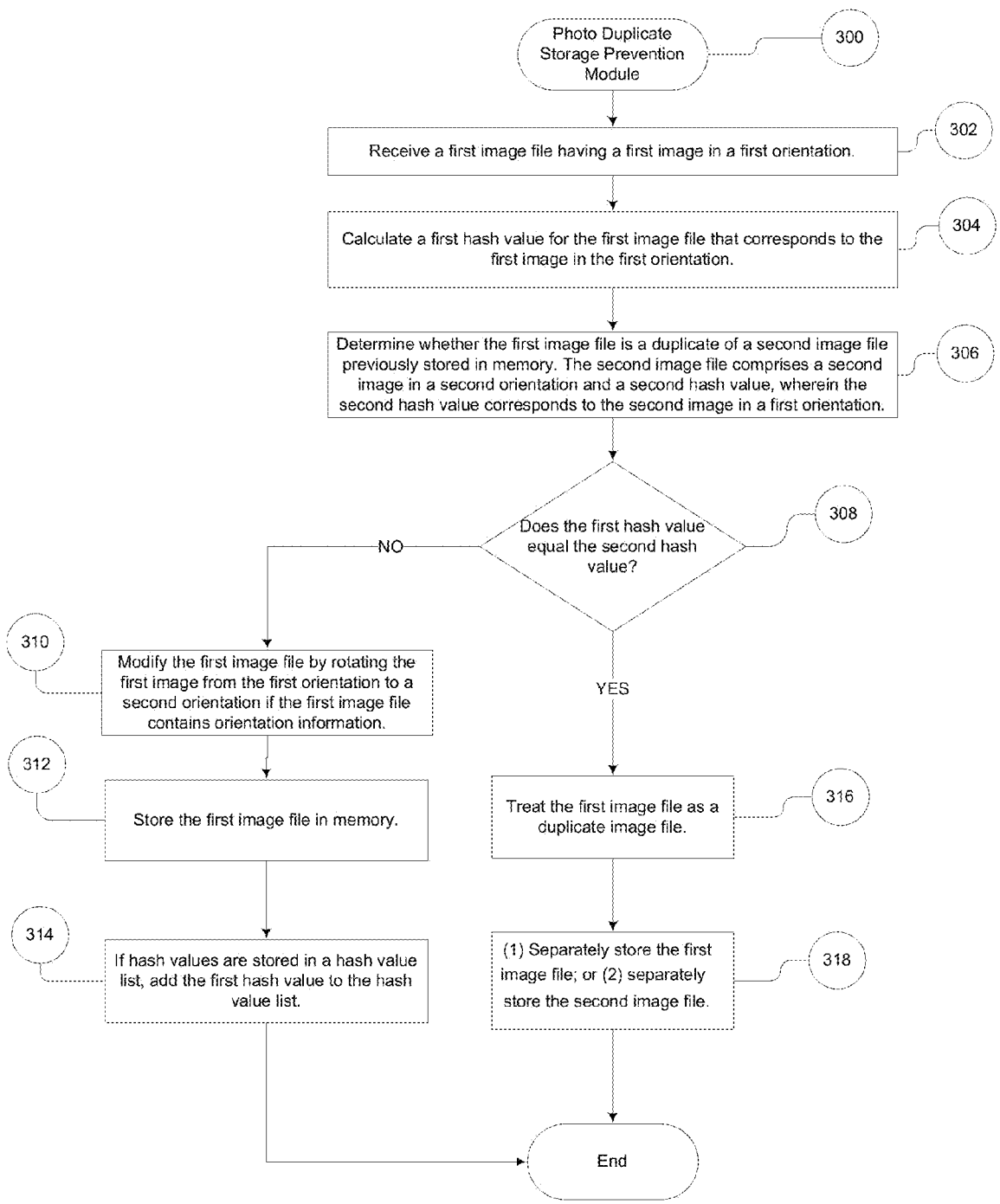
FIG. 3 shows a flow diagram that generally illustrates various steps executed by a computer in accordance with various embodiments of the system of FIG. 1.

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., image rotation and modification module 29, which is configured to carry out the steps illustrated in FIG. 3) embodying any one or more of the methodologies or functions described herein. Image rotation and modification module 29 may also reside, completely or at least partially, within main memory 204 and/or within processing device 202 during execution thereof by computer 200, main memory 204, and processing device 202 also constituting computer-accessible storage media. Instructions 222 (e.g., file organizing module 29) may further be transmitted or received over network 220 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media.

Exemplary System Operation

FIG. 3 shows method steps that are embodied in exemplary image rotation and modification module 29, in accordance with various embodiments. A computer configured to carry out the method rotates an image in an image file from a first orientation into a second orientation based on image orientation information associated with the image file. The method also determines whether the first image file is a duplicate of a previously uploaded second image file.

Beginning at step 302, content management system 5 may be configured to receive a first image file and orientation information associated with the first image file (e.g., in metadata associated with the image file). The image orientation information may contain data that indicates the orientation of a camera at the time the first image was captured. For example, when capturing a photo, a camera may be rotated ninety degrees to capture a portrait image. Thus, in various embodiments, the content management system may use the orientation information to adjust the orientation of the image (e.g., by ninety degrees, negative ninety degrees, or one hundred and eighty degrees from the image's current orientation). In various embodiments, the content management system can be configured to alter the orientation through either rotating the image or flipping the image across an axis, such as a horizontal, vertical, or diagonal axis.

At step 304, in the process of uploading the file to the content management system, the system may be configured to calculate a first hash value for the first image file that corresponds to the first image in the first orientation (e.g., the raw unmodified image file). In various embodiments, the system may also calculate a second hash value once the first image is rotated from the first orientation into the second orientation. In this way, the system may be configured to use multiple hash values to detect when an unmodified or modified duplicate image file is being uploaded to the system.

It should be recognized that there are numerous ways to calculate a hash value. For example, in embodiments where a mobile device is uploading the file to the system, a mobile hash value may be calculated, using a hash algorithm, based on a size of the image file and the data in the first 8 kilobytes of the image file. This is advantageous since mobile client devices (e.g., smart phones) may have limited bandwidth and processing power. In embodiments where a desktop computer device is uploading the image file to the system, the hash value may be calculated based on all of the data that makes up the image file. Additionally, the algorithm used to calculate the hash value may be a message digest checksum algorithm, such as the MD family of hash functions (e.g., MD5).

In various embodiments, each calculated hash value may be unique to a particular image file associated with the account on the content management system. The hash value(s) for each image file may be stored in hash value list 26, which may be maintained by content management server 20. In some embodiments, hash value list 26 may contain multiple hash values for each image file associated with an account (e.g., a mobile hash value and/or a full hash value). Maintaining multiple hash values associated with each image file allows the content management server to maintain a single hash value list for each account that can be used by all types of client devices (e.g., mobile and desktop clients) linked to the account.

At step 306, the system may be configured to determine whether the first image file is a duplicate of a previously uploaded second image file having a second image in either a first or a second orientation by comparing the hash value of the first image file to a second hash value for the second image file. The second hash value, similar to the first hash value, may correspond to the second image in its original orientation (e.g., a first orientation) or in a rotated second orientation. Like the first image file, the second image file's hash value may be calculated when the second image is in the first orientation so the first hash value and the second hash value may be accurately compared and unmodified duplicate image files can be detected. In various other embodiments, the hash value for the second image file may be calculated when the second image is in the second orientation. In this way, the system may be configured to determine when a modified image file has been previously uploaded to the content management server.

At step 308, the system may compare the first hash value to the second hash value to determine whether the first hash value is equal to the second hash value. If the first hash value is unique, then, at step 310, content management system 5 may be configured to modify the first image file by rotating the first image from the first orientation to a second orientation based on orientation data associated with the first image file. In some embodiments, the first image may be rotated based on the orientation of the device that captured the image. In other embodiments, the first image may be rotated based on an application associated with the image file (e.g., image editing software may require that the image be in a particular orientation). In various embodiments, the image may be rotated at the time the image file is imported on a client device. In still other embodiments, the image file may be rotated after content management client application 12 uploads the image file to content management server 20. It should also be understood that not all image files contain orientation data. Thus, when orientation data is not available for an image file, the image file is not rotated by the system, and is uploaded with the image in the first orientation.

Once the file has been modified, at step 312, the system may store the first image file in memory. At step 314, if the system is configured to maintain a hash value list, the system may update hash value list 26 to include the first hash value. In various embodiments, the system may compare the first hash value to later received files to determine if the later received files are duplicates.

If, on the other hand, the first hash value is equal to the second hash value, at step 316, the content management system may treat the first image file as a duplicate file. At step 318, in various embodiments, the content management system may prevent the first image file from being uploaded, or store the first image file in a separate location (e.g., a temporary location). In other embodiments, the content management system may be configured to store the first image file in memory, or store the second image file in a separate location when the first image file is uploaded.

In various embodiments, the content management server is part of a synchronized content management system such as the Dropbox™ Service.

Exemplary Experience

The following examples are provided to further enhance understanding of the present disclosure. It should be understood that the present disclosure may be embodied in many different forms and the following examples should not be construed as limited to the embodiments set forth herein.

Figure 4:
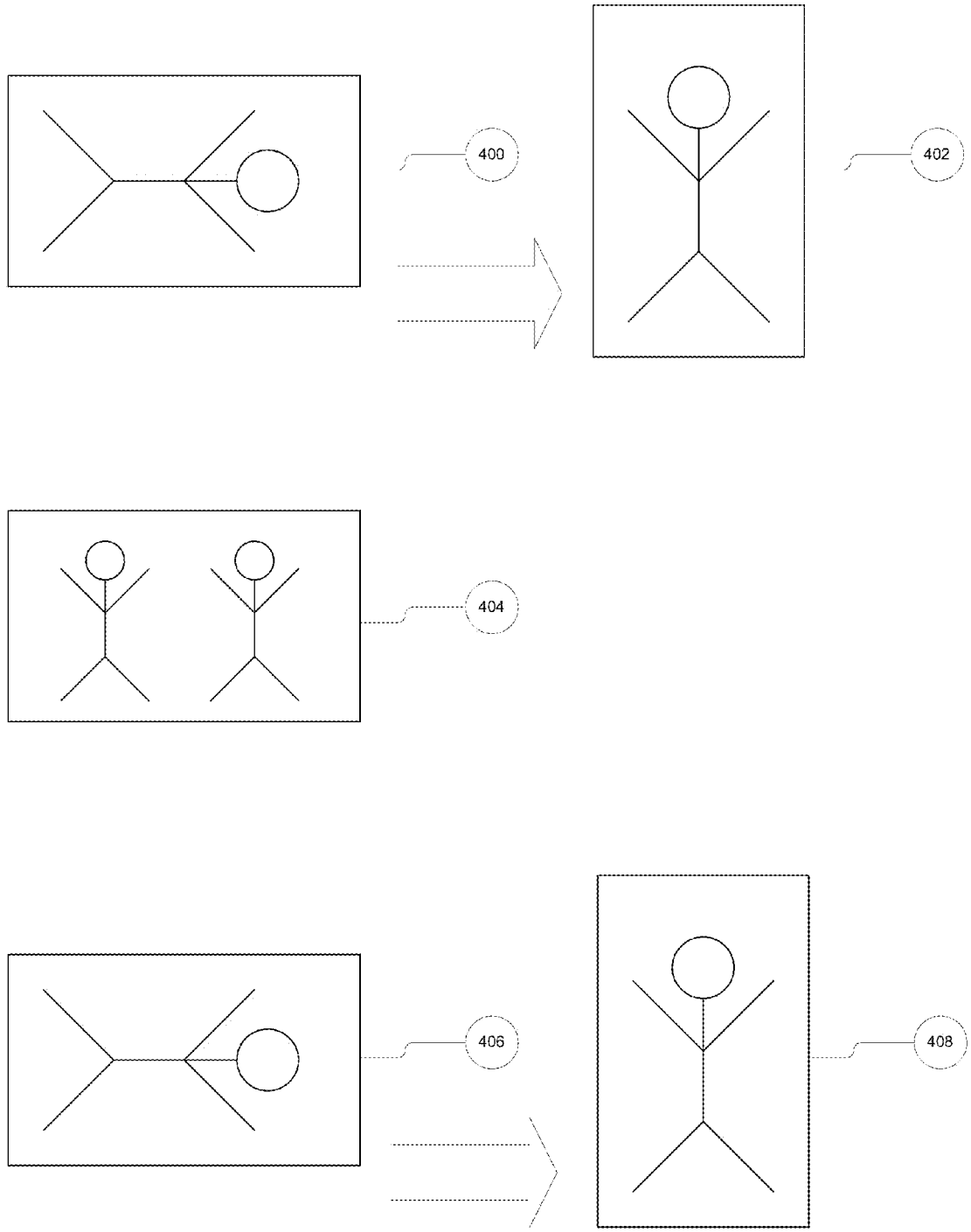
FIG. 4 shows an example of the operation of the system of FIG. 1.

Referring to FIG. 4, a user imports and attempts to upload three image files onto content management system 5: 400, 404, and 406. Images 400 and 406 are embodied in identical image files, but are imported and uploaded at different times using different client devices. Moreover, images 400 and 406 are rotated ninety degrees from the optimal orientation (with the figure's head up) and are considered to be in a first orientation. In this example, images 400 and 406 may have been captured using a camera that was rotated ninety degrees when the image was captures.

First, a user imports image 400 onto client device 10. Image 400 also has associated metadata including orientation information. The system calculates a hash value for image 400 with the image in the first orientation. As a simple example, the hash value for image 400 equals 123. In the first orientation, the photo is rotated ninety degrees from the optimal orientation. Next, using the orientation information associated with the image file for image 400, the system rotates image 400 negative ninety degrees into a second orientation as image 402. Once the image is rotated, the system updates the image file to include the new orientation information and saves the image file. Although the image was rotated from the first orientation to the second orientation, the image file for image 402 continues to be associated with the hash value calculated for the image 400 in the first orientation. Therefore, no matter how the image is modified, the hash value is always associated with the image in the first orientation. The system uploads the image file with the image in the second orientation (e.g., image 402) and the hash value that is associated with the image in the first orientation (e.g., image 400).

Second, a user uploads image 404 where the image is in a first orientation. Like image 400, image 404 has associated metadata including orientation information. The system calculates a hash value for image 404 while the image is in the first orientation. The hash value for image 404 equals 234. The orientation information indicates that the photo is rotated correctly so the system does not modify the image. At this point, the system checks the hash value of image 404, with the image in the first orientation, against the hash value of image 402, which was calculated based on image 400. Here, the hash value 234 does not equal the hash value 123, so the system determines that image 404 is not a duplicate of image 402 and uploads image 404 and its associated hash value to content management system 5.

Third, a user imports image 406, where the image is in a first orientation. Image 406 has associated metadata, including orientation information. The system calculates a hash value for image 406 with the image in a first orientation. Because image 406 is the same image file as the image file for image 400, the system calculates a hash value that equals 123 for image file 406 with the image in the first orientation. In various embodiments, the system may be configured to determine if image file 406 is a duplicate of a previously uploaded image file by comparing the hash value for image 406 to the hash value of previously uploaded image files. In the present example, the system would detect that the image file for image 406 has previously been uploaded since its hash value is equal to a previously modified and uploaded image file for image 402.

In other embodiments, the system may be configured to rotate image 406 prior to checking whether the image file for image 406 is a duplicate file. In this particular embodiment, the system, after calculating the hash value for image 406, would rotate image 406 to the second orientation shown as image 408. Once the image is rotated and the image file updated, the system may upload the image file for image 408 and the associated hash value to the content management server 20, where the system checks the hash value for image 408 against the hash values for images 402 and 404 to determine if the image file is a duplicate of a previously uploaded image file. If the hash value associated with image 408 matches the hash value associated with image 402, the system may be configured to (1) delete image 408 from the server as a duplicate, (2) store image 408 in a temporary location, or (3) store image 408 and delete previously uploaded image 402.

Conclusion

Having the benefit of the teachings presented in the foregoing descriptions and associated drawings, one of skill in the art should recognize many modifications and other embodiments of the invention. In light of the above, it is to be understood that the invention is not to be limited to the specific embodiments disclosed and that modifications and other embodiments are intended to be included within the scope of the appended claims. For example, although many of the examples described above in the context of preventing the uploading and/or storage of duplicate photo files, the same or similar techniques may be used to prevent the uploading and/or storage of duplicate files of other types (e.g., document files, music files, video files, and .pdf files). Although specific terms are employed herein, they are used in a generic and descriptive sense only and not for the purposes of limitation.

What is claimed:

1. A computer-implemented method of modifying image files and uploading the modified image file to a content management system, comprising:
   for a first image file:
      receive the first image file, wherein the first image file contains a first image in a first orientation and orientation data for the first image;
      calculate, by at least one computer processor, a first hash value for the first image file that corresponds to the first image in the first orientation;
      modify, by at least one processor, the first image file by rotating the first image from the first orientation to a second orientation based on the orientation data;
      calculate, by the at least one computer processor, a second hash value for the first image file that corresponds to the first image in the second orientation, wherein the second orientation is different from the first orientation; and
      store the modified first image file, calculated first hash value and calculated second hash value in memory,
   for a second image file:
      receive the second image file, wherein the second image file contains a second image in a first orientation; and
      calculate, by at least one computer processor, a third hash value for the second image file that corresponds to the second image in the first orientation; and
      determine whether the calculated first hash value or the calculated second hash value equals the third hash value;
      in response to determining that the calculated first hash value or the calculated second hash value equals the calculated third hash value, treating the second image file as a duplicate of the first image file.

2. The computer-implemented method of claim 1, wherein the second image file comprises the first image in the first orientation.

3. The computer-implemented method of claim 1, wherein treating the second image file as a duplicate of the first image file further comprises deleting the second image file.

4. The computer-implemented method of claim 1, wherein treating the second image file as a duplicate of the first image file comprises deleting the first image file.

5. The computer-implemented method of claim 1, wherein the first image file is received from a first client device and the second image file is received from a second client device.

6. The computer-implemented method of claim 1, wherein the step of modifying the first image file by rotating the first image further comprises rotating the first image by an amount chosen from a group consisting of: ninety degrees, one-hundred and eighty degrees, and minus ninety degrees; or flipping the image file across an axis chosen from a group consisting of: vertical, horizontal, and diagonal.

7. The computer-implemented method of claim 1, further comprising updating the first image file to include information that the first image file is in the second orientation.

8. The computer-implemented method of claim 7, further comprising storing the updated first image file in memory operatively coupled to the at least one processor.

9. The computer-implemented method of claim 1, further comprising determining whether the second image file contains orientation data.

10. A system of preventing storage of image files, within the context of a synched content management system, that were previously modified and stored on the content management system, comprising at least one hardware processor configured to:
receive a first image file having a first image in a first orientation;
calculate a first hash value for the first image file that corresponds to the first image in the first orientation;
rotate the first image from the first orientation to a second orientation, wherein the second orientation is based on orientation data contained in the first image file, wherein the second orientation is different from the first orientation;
calculate a second hash value for the first image file that corresponds to the first image in the second orientation;
update the first image file to include orientation information that corresponds to the first image in the second orientation; and
initiate storage of the updated first image file, including the rotated first image in the second orientation, the calculated first hash value and the calculated second hash value.

11. The system of claim 10, wherein the at least one hardware processor is further configured to: determine, prior to initiating storage of the updated first image file, whether the updated first image file is a duplicate of a previously stored second image file; and if so, prevent the initiation of storage of the updated first image file.

12. The system of claim 11, wherein determining whether the updated first image file is a duplicate of a previously uploaded second image file further comprises determining if the calculated first hash value or the calculated second hash value for the first image file is contained in a list of hash values, wherein the list of hash values comprises a hash value for the second image file that corresponds to a second image in a first orientation.

13. The system of claim 11, wherein the step of determining whether the updated first image file is a duplicate of a previously stored second image file is performed prior to the step of rotating the first image.

14. A content management system comprising:
at least one computer processor; and
memory operatively coupled to the at least one processor, wherein the at least one processor is configured to:
receive a first image file having an image in a first orientation;
calculate a first hash value for the first image file that corresponds to the first image in the first orientation;
modify the first image file by rotating the first image from the first orientation to a second orientation based on orientation information for the first image, wherein the second orientation is different from the first orientation;
calculate a second hash value for the first image that corresponds to the first image in the second orientation;
determine whether the modified first image file is a duplicate of a second image file comprising a second image, previously stored in the memory, by comparing the calculated first hash value and the calculated second hash value for the first image file to a third hash value for the second image file; and
store the modified first image, the calculated first hash value and the calculated second hash value in memory if the modified first image file is not a duplicate of the second image file based on the comparison.

15. The content management system of claim 14, wherein the at least one computer processor is further configured to, if the first image file is not a duplicate image file, store the modified first image file in the memory.

16. The content management system of claim 14, wherein the at least one computer processor is further configured to: update the first image file to include information regarding rotation of the first image from the first orientation into the second orientation; store the updated first image file to the memory; and add the calculated first hash value and calculated second hash value to the list of hash values for previously received and modified image files.

17. The content management system of claim 14, wherein determining whether the modified first image file is a duplicate of a second file is carried out within the context of a synched content management system.

18. A content management system comprising;
a means for receiving a first image file, the first image file having an image in a first orientation and orientation data for the image;
a means for calculating a first hash value for the first image file with the first image in a first orientation;
a means for rotating the first image file from the first orientation into a second orientation based on the orientation data;
a means for calculating a second hash value for the first image file with the first image in a second orientation, wherein the second orientation is different from the first orientation;
a means for determining if the first image file is a duplicate of a previously modified and uploaded second image file, by comparing the calculated first hash value and the calculated second hash value for the first image file to a third hash value for the previously modified and uploaded second image file; and
a means for storing the rotated first image file, the calculated first hash value and the calculated second hash value if the first image file is not a duplicate of the previously modified and uploaded second image file based on the determination.

19. The content management system of claim 18, wherein the means for calculating a first hash value is chosen from a group consisting of a client device and at least one content management server.

20. The content management system of claim 18, wherein the means for determining further comprises a means for comparing the first hash value to a second hash value for modified second image file is based on a second image in a first orientation.

21. The content management system of claim 18, wherein the content management system is a synchronized content management system.

22. The content management system of claim 18, wherein the first image file is received from a first client device configured to run a first operating system and the second image file is received from a second client device configured to run a second operating system.

* * * * *